US012588737B2

(12) United States Patent　　　　　(10) Patent No.:　US 12,588,737 B2
Paulson et al.　　　　　　　　　　　　　　　(45) Date of Patent:　　Mar. 31, 2026

(54) FOOTWEAR SOLE AND RELATED METHOD OF USE

(71) Applicant: Saucony, Inc., Waltham, MA (US)

(72) Inventors: Andrea A. Paulson, Waltham, MA (US); Christopher J. Mahoney, Concord, MA (US); Aaron P. St. Peter, Hampstead, NH (US)

(73) Assignee: Saucony, Inc., Waltham, MA (US)

( * ) Notice: Subject to any disclaimer, the term of this patent is extended or adjusted under 35 U.S.C. 154(b) by 0 days.

(21) Appl. No.: 18/629,459

(22) Filed: Apr. 8, 2024

(65) Prior Publication Data

US 2024/0381973 A1　　　Nov. 21, 2024

Related U.S. Application Data

(60) Provisional application No. 63/467,124, filed on May 17, 2023.

(51) Int. Cl.
*A43B 13/12*　　　　(2006.01)
*A43B 13/18*　　　　(2006.01)
*A43B 23/02*　　　　(2006.01)
*B29D 35/00*　　　　(2010.01)
*B29K 21/00*　　　　(2006.01)
*B29K 67/00*　　　　(2006.01)
*B29K 105/04*　　　(2006.01)

(52) U.S. Cl.
CPC .......... *A43B 13/188* (2013.01); *A43B 13/125* (2013.01); *A43B 13/127* (2013.01); *A43B 23/02* (2013.01); *B29D 35/0054* (2013.01);

*B29K 2021/003* (2013.01); *B29K 2067/00* (2013.01); *B29K 2105/04* (2013.01)

(58) Field of Classification Search
CPC ... A43B 13/125; A43B 13/127; A43B 13/187; A43B 13/188
USPC ..................................................... 36/107, 108
See application file for complete search history.

(56) References Cited

U.S. PATENT DOCUMENTS

| | | | | | |
|---|---|---|---|---|---|
| 4,399,620 | A | * | 8/1983 | Funck | ................... B29D 35/14 |
| | | | | | 36/28 |
| 7,096,605 | B1 | * | 8/2006 | Kozo | ...................... A43B 7/26 |
| | | | | | 36/76 R |
| 8,769,843 | B2 | * | 7/2014 | Cook | ................... A43B 13/188 |
| | | | | | 36/102 |
| 10,524,540 | B1 | * | 1/2020 | Eldem | ................... A43B 13/20 |

(Continued)

*Primary Examiner* — Sharon M Prange
(74) *Attorney, Agent, or Firm* — Warner Norcross + Judd LLP

(57)　　　　　　　　　ABSTRACT

A footwear construction including a sole assembly, which can include a midsole including a midsole support wall forming a compartment and a compression molded core constructed from thermoplastic polyester elastomer (TPEE) disposed in the compartment and shielded from abrasion in the environment of the footwear in use via the midsole support wall. The core can be formed by compressing a foam core to increase its density, for example, from a first density between 0.05 g/cm³ and 0.08 g/cm³, inclusive, to a second density between about 0.09 g/cm³ and 0.12 g/cm³, inclusive. Such compression molding and the attendant density increase of the TPEE core can increase energy efficiency to at least 95% energy efficiency, when the midsole is installed in footwear. A related method of manufacture is provided.

18 Claims, 11 Drawing Sheets

(56)     References Cited

U.S. PATENT DOCUMENTS

| 10,743,612 | B2 * | 8/2020 | Luchi | ..................... | A43B 13/04 |
| 2007/0068039 | A1 * | 3/2007 | Nau | ..................... | A43B 3/0036 |
| | | | | | 36/102 |
| 2010/0307028 | A1 * | 12/2010 | Teteriatnikov | ....... | A43B 13/145 |
| | | | | | 36/108 |
| 2016/0015122 | A1 * | 1/2016 | Nishiwaki | ........... | A43B 13/223 |
| | | | | | 36/30 R |
| 2018/0027923 | A1 * | 2/2018 | Iuchi | ..................... | A43B 13/223 |
| 2020/0383422 | A1 * | 12/2020 | Bidal | ..................... | A43B 13/41 |
| 2021/0037911 | A1 * | 2/2021 | Paulson | ............... | A43B 13/127 |
| 2021/0079188 | A1 * | 3/2021 | Baghdadi | .............. | A43B 13/26 |
| 2022/0211142 | A1 * | 7/2022 | Paulson | .............. | A43B 13/141 |
| 2023/0002577 | A1 * | 1/2023 | Baghdadi | ........... | B29C 44/0461 |
| 2023/0270203 | A1 * | 8/2023 | Bartel | ..................... | B32B 3/263 |
| | | | | | 36/28 |
| 2024/0074530 | A1 * | 3/2024 | Tateno | ................. | A43B 13/188 |
| 2024/0114998 | A1 * | 4/2024 | Giandolini | ........... | A43B 13/122 |
| 2024/0292926 | A1 * | 9/2024 | Tateno | ................. | A43B 13/125 |

* cited by examiner

FOOTWEAR SOLE AND RELATED METHOD OF USE

BACKGROUND OF THE INVENTION

The present invention relates to footwear, and more particularly to a sole assembly for footwear with improved energy efficiency.

A typical footwear construction includes an upper joined with a sole assembly. The sole assembly underlies the wearer's foot and provides a ground-engaging surface that protects the wearer's foot. In addition to protecting the wearer's foot, sole assemblies are often designed to provide the desired support, cushioning and energy return. To achieve these objectives, footwear is available with a wide variety of different soles or sole assemblies.

In many articles of footwear, the sole assembly incorporates a midsole to provide the cushioning, stability and energy return. The midsole can be constructed from a variety of materials, such as EVA, eTPU and/or PEBA. Each of these materials has its advantages and drawbacks. EVA is a popular midsole material because it provides decent cushioning, satisfactory energy return, good stability and wear resistance. EVA is, however, somewhat heavy, and can be on the lower end of the energy efficiency spectrum. eTPU and PEBA provide exceptional cushioning and energy return, but have issues with stability and side to side shear forces. These materials sometimes feel less stable underfoot.

The properties of a midsole are complex and depend greatly on a variety of factors, most notably the design and configuration of the midsole, and the cushioning materials from which the midsole is constructed. Too little cushioning material may not provide adequate cushioning and may reduce the comfort level of the sole assembly. On the other hand, too much cushioning material may make the sole assembly excessively thick and may reduce the energy return and overall energy efficiency of the footwear.

Accordingly, there remains room for improvement in the field of footwear sole assemblies, and more particularly, in connection with midsoles and the materials from which the midsoles are constructed, to provide an optimized combination of support, cushioning and energy efficiency.

SUMMARY OF THE INVENTION

A footwear construction including a sole assembly is provided. The sole assembly can include a midsole having a midsole support wall forming a compartment and a compression molded core disposed in the compartment and at least partially shielded from abrasion in the environment of the footwear in use via the midsole support wall.

In one embodiment, the compression molded core can be formed by compressing a foam material in a mold to increase density of the foam, for example, from a first density between 0.05 g/cm$^3$ and 0.08 g/cm$^3$, inclusive, to a second density between about 0.09 g/cm$^3$ and 0.12 g/cm$^3$, inclusive. Such compression molding and the attendant density increase of the core can increase energy efficiency to at least 95% energy efficiency, when the midsole is installed in footwear.

In another embodiment, the foam core can be constructed from a thermoplastic polyester elastomer (TPEE). The foam can have a durometer after compression of 20 Asker C to 40 Asker C, inclusive, 20 Asker C to 30 Asker C, inclusive, or 30 Asker C to 40 Asker C, inclusive. This durometer can be relatively low, and the foam core can be susceptible to deformation, damage, scuffing or tearing when subjected to objects, obstacles, ground surfaces or terrain in the environment when left uncovered or unprotected in some cases.

In still another embodiment, the compression molded core can have a tensile strength between 1.5 MPa and 2.0 MPa, inclusive, and optionally about 1.75 MPa. The core can have a percent elongation at break of between 300% and 400%, inclusive, and optionally about 350%.

In yet another embodiment, the compression molded core can be protected from abrasion at least partially via the midsole support wall. This wall can surround all or a part of the compression molded core to protect it. The core can include a free edge, and the midsole support wall can extend upward along and can conceal the free edge of the core.

In even another embodiment, the midsole support wall can be constructed from another material, optionally a foam, having a durometer of 45 Asker C to 70 Asker C, inclusive. This wall can be abrasion resistant, and it can form an exterior of the sole assembly and/or midsole.

In a further embodiment, the midsole support wall can include an upper portion having a bite line. This bite line optionally can be adhered to a peripheral allowance of an upper to secure the midsole, including the compression molded core to the upper. The bite line of the midsole support wall can be secured to the upper along an allowance or a generally vertical support surface of the upper, rather than the compression molded core.

In still a further embodiment, the sole assembly can include an outsole disposed below the midsole and under the entire core lower surface of the compression molded core. This outsole can offer protection to prevent the abrasion or tear prone core from contacting underfoot terrain or the ground in use.

In yet a further embodiment, the sole assembly can include a plate extending from a forefoot region toward a heel region of the sole assembly. The plate can be disposed below the core lower surface, can include a plate upper surface and a plate lower surface. The plate upper surface can contact and engage the core lower surface.

In even a further embodiment, the sole assembly can include a secondary midsole disposed below the plate. The secondary midsole can include a secondary midsole upper surface contacting the plate lower surface and a secondary midsole lower surface. The outsole can be joined directly with the secondary midsole lower surface to complete the sole assembly.

In another embodiment, a method is provided. The method can include compression molding a sheet of foam, optionally constructed from a thermoplastic polyester elastomer, to increase a density of the foam from a first density between 0.05 g/cm$^3$ and 0.08 g/cm$^3$, inclusive, to a second density between about 0.09 g/cm$^3$ and 0.12 g/cm$^3$, inclusive, thereby forming a compression molded core; placing the compression molded core constructed from the thermoplastic polyester elastomer within a compartment defined by a midsole and surrounded by a midsole support wall that extends upward above a free edge of the compression molded core to conceal the free edge; and covering the compression molded core so that the free edge and a core lower surface are concealed and covered. The compression molded core can, of course, retain the second density when disposed in the compartment of the midsole. Optionally, the first density is 0.08 g/cm$^3$, and is increased to the second density which is 0.12 g/cm$^3$, thereby forming the compression molded core.

In still another embodiment, the compression molded core and midsole wall can be similar to the above embodiments, however, the midsole wall can extend only partially upward along the free edge of the core, with a first portion of the free edge of the core protected, and a second portion of the free edge of the core above the first portion exposed to the environment, unconcealed by the wall.

In even another embodiment, the compression molded core can include an upper core portion projecting above the midsole wall and a remaining unitary layer of the midsole below the wall. The upper core portion can include a bite line that can be adhered to a peripheral allowance of an upper to secure the midsole, including the compression molded core to the upper. The midsole support wall can be separated from and unattached to the upper along the allowance or a generally vertical support surface of the upper, and instead, the compression molded core can be attached to the upper there.

In a further embodiment, a method is provided. The method can include compression molding a sheet of foam, optionally constructed from a thermoplastic polyester elastomer, to increase a density of the foam from a first density between 0.05 g/cm$^3$ and 0.08 g/cm$^3$, inclusive, to a second density between about 0.09 g/cm$^3$ and 0.12 g/cm$^3$, inclusive, thereby forming a compression molded core; placing the compression molded core constructed from the thermoplastic polyester elastomer partially within a compartment defined by a midsole and surrounded by a midsole support wall, so that the core extends above the midsole support wall and a portion of the compression molded core is exposed above the wall. The compression molded core can, of course, retain the second density when disposed in the compartment and above the remainder of the midsole. Optionally, the first density is 0.08 g/cm$^3$, and is increased to the second density which is 0.12 g/cm$^3$, thereby forming the compression molded core. The current embodiments provide a sole assembly including a midsole having a compression molded core that is surprisingly energy efficient. Due to the compression molding of the core, particularly where the core is constructed from TPEE and increases in density due to compression, the core can become extremely energy efficient over the basic core material before compression. In some cases, the compression molding and the attendant density increase of the TPEE core can increase energy efficiency from less than about 70% energy efficiency to at least 95% energy efficiency, when the midsole is installed in footwear.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

Figure 1:
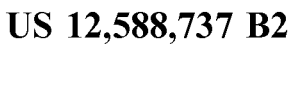
FIG. 1 is a side view of an article of footwear incorporating a sole assembly according to current embodiment.

A footwear construction of a current embodiment is shown in FIGS. 1-4 and generally designated 10. The footwear 10 can include a sole assembly 20 that incorporates a midsole 30 having a primary midsole 40, a plate 60 and a secondary midsole 70. The sole assembly 20 can include an outsole 50 that is joined to a lower surface of the secondary midsole 70. The midsole, and in particular, the primary midsole 40 can include a compression molded core 45 that when included in the sole assembly can provide surprising energy efficiency, sometimes at least 95% energy efficiency or energy return. The compression molded core can be produced by compression molding a sheet of thermoplastic polyester elastomer in a mold, to physically and structurally increase a density of the foam from a first density between 0.05 g/cm$^3$ and 0.08 g/cm$^3$, inclusive, to a second density between about 0.09 g/cm$^3$ and 0.12 g/cm$^3$, inclusive, thereby forming a compression molded core.

Although a current embodiment is illustrated in the context of a running shoe, the sole assembly thereof can be incorporated into any type or style of footwear, including performance shoes, trail shoes and boots, work boots, all-terrain shoes, hiking shoes, athletic shoes, sneakers, conventional tennis shoes, walking shoes, multisport footwear, casual shoes, dress shoes or any other type of footwear or footwear components. It also should be noted that directional terms, such as "vertical," "horizontal," "top," "bottom," "upper," "lower," "inner," "inwardly," "outer" and "outwardly," are used to assist in describing the invention based on the orientation of the embodiments shown in the illustrations. Further, the terms "medial," "lateral" and "longitudinal" are used in the manner commonly used in connection with footwear. For example, when used in referring to a side of the shoe, the term "medial" refers to the inward side (that is, the side facing the other shoe) and "lateral" refers to the outward side. When used in referring to a direction, the term "longitudinal direction" refers to a direction generally extending along the length of the shoe between toe and heel, and the term "lateral direction" refers to a direction generally extending across the width of the shoe between the medial and lateral sides of the shoe.

The use of directional terms should not be interpreted to limit the invention to any specific orientation. Further, as used herein, the term "arch region" (or arch or midfoot) refers generally to the portion of the footwear or sole assembly corresponding to the arch or midfoot of the wearer's foot; the term "forefoot region" (or forefoot) refers generally to the portion of the footwear forward of the arch region corresponding to the forefoot (for example, including the ball and the toes) of a wearer's foot; and the term "heel region" (or heel) refers generally to that portion of the footwear rearward of the arch region corresponding to the heel of the wearer's foot. The forefoot region 11, arch region or mid-foot region 12, and heel region 13 generally are identified in FIG. 1; however, delineation of these regions may vary depending upon the configuration of the sole assembly and/or footwear. Further, the footwear and sole assembly can include a longitudinal axis LA that generally bisects the same into lateral and medial portions, as well as a length L and a width W along the length.

The footwear 10 can include a textile upper 14 joined with the sole assembly 20. The upper 14 can be formed from a variety of material elements joined together to cover at least a portion of the wearer's foot. The material elements can be selected based on the intended uses of the article of footwear 10, and can include synthetic textiles, mesh textiles, polymers or leather, for example. The upper 14 can be constructed to improve the rigidity of the sole assembly 20. For example, the upper can be constructed from leather, plastic, canvas or other materials. The upper 14 can include one or more closure elements, including, for example, shoelaces. The upper 14 additionally includes an upper opening for receiving the wearer's foot.

The upper 14 may be secured to sole assembly 20 using any form of attachment. Optionally, the upper 14 can extend downward along an upper sidewall 15S to a lower portion 15L including a lower perimeter or allowance 16. This allowance can be secured to an insole or Strobel board 17 via stitching, adhesives or other connecting techniques. The lower portion 15L, sidewall 15S and/or allowance 16 of the upper 14 can be secured to the midsole 40 as described below via an adhesive. The lower surface 17L of the Strobel board can be secured to the sole assembly 20 and midsole 40 as described below. The joining of the sole assembly, midsole and the upper components can be accomplished using adhesives, cement, injection molding, pour molding or any other technique used to join an upper and sole assembly.

Figure 4:
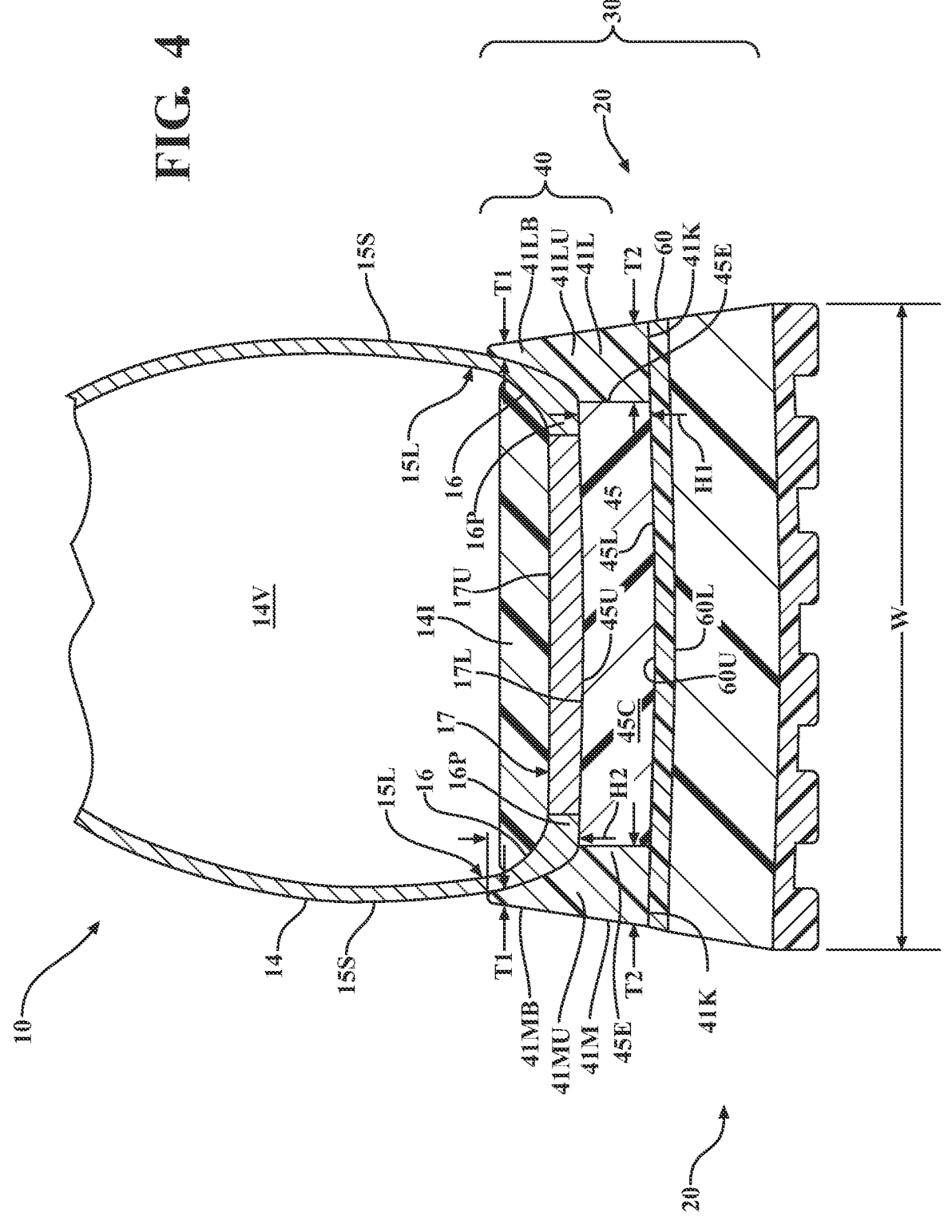
FIG. 4 is a section view of the footwear.
Figure 5:
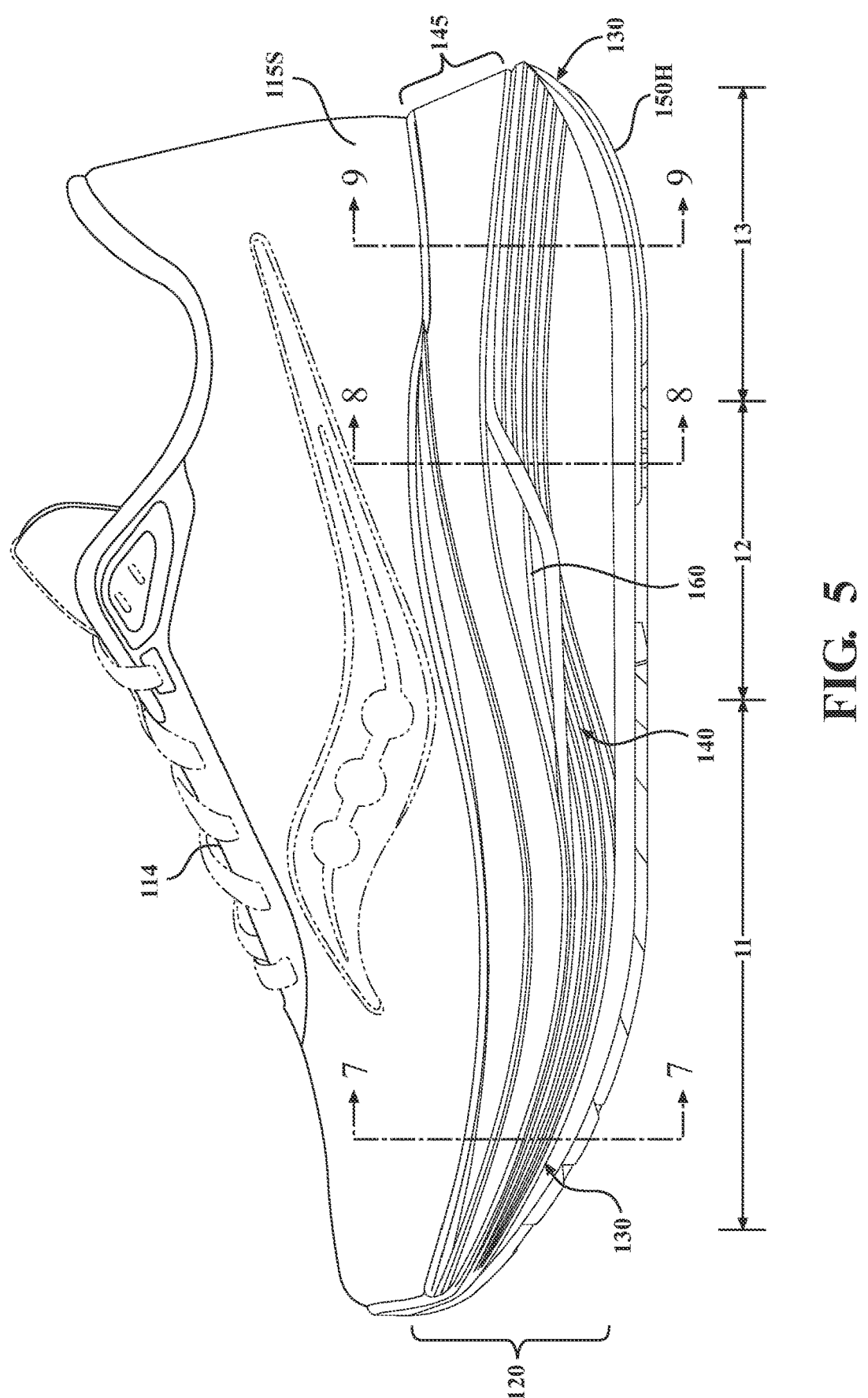
FIG. 5 is a side view of the footwear incorporating a sole assembly of a first alternative embodiment.
Figure 6:
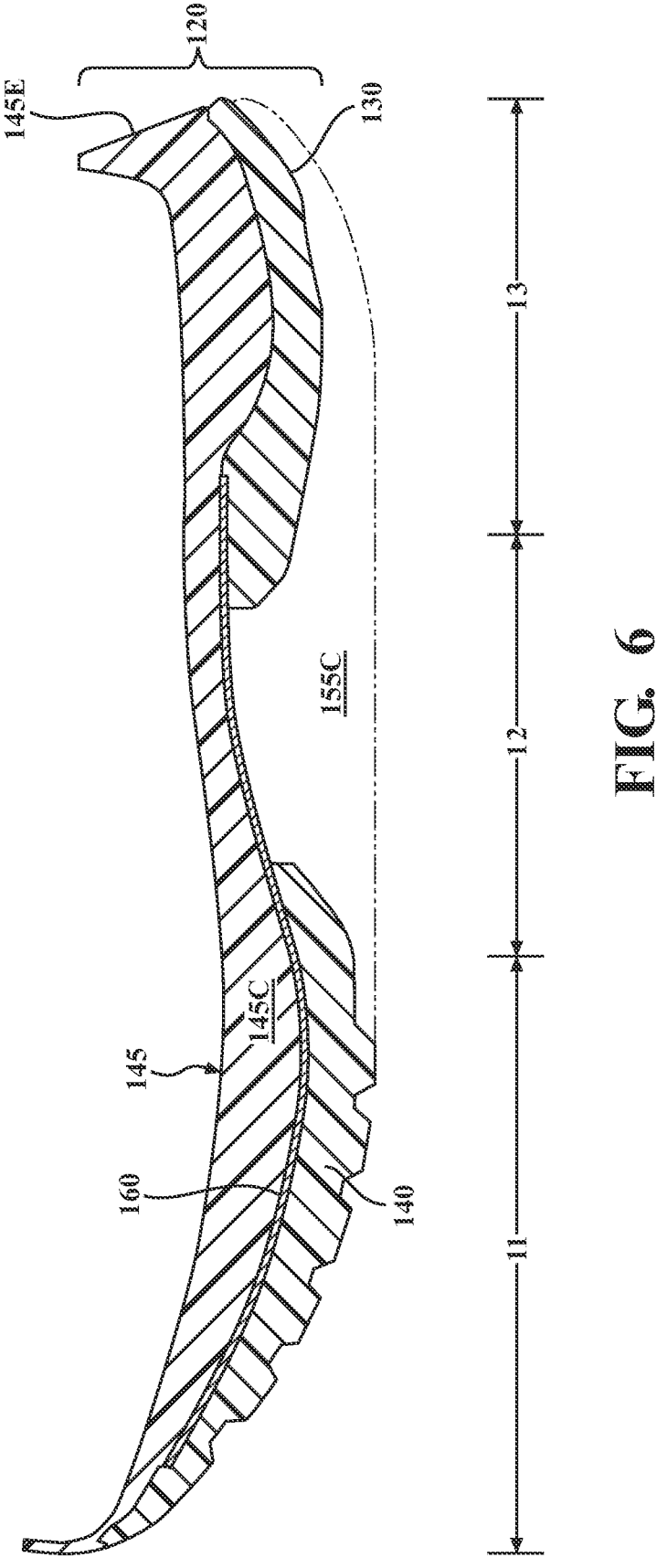
FIG. 6 is a longitudinal section view thereof with the upper removed.

As further shown in FIG. 4, the footwear 10 can include an inner sole or footbed 14I positioned within the void 14V defined by the upper 14. The insole 14I can be constructed from a sheet of material, such as foam, EVA, PU, latex, gel or other materials, and by virtue of its compressibility, provide cushioning, and may also conform to the foot in order to provide comfort, support, and stability. The footbed 14I need not be constructed from a sheet material, but may instead be formed by other techniques, such as injection molding, compression molding or additive manufacturing. The footbed can be disposed above the upper surface 17U of the Strobel board, in the void 14V defined by the upper 14, and generally does not form part of the midsole or the sole assembly 20.

Figure 2:
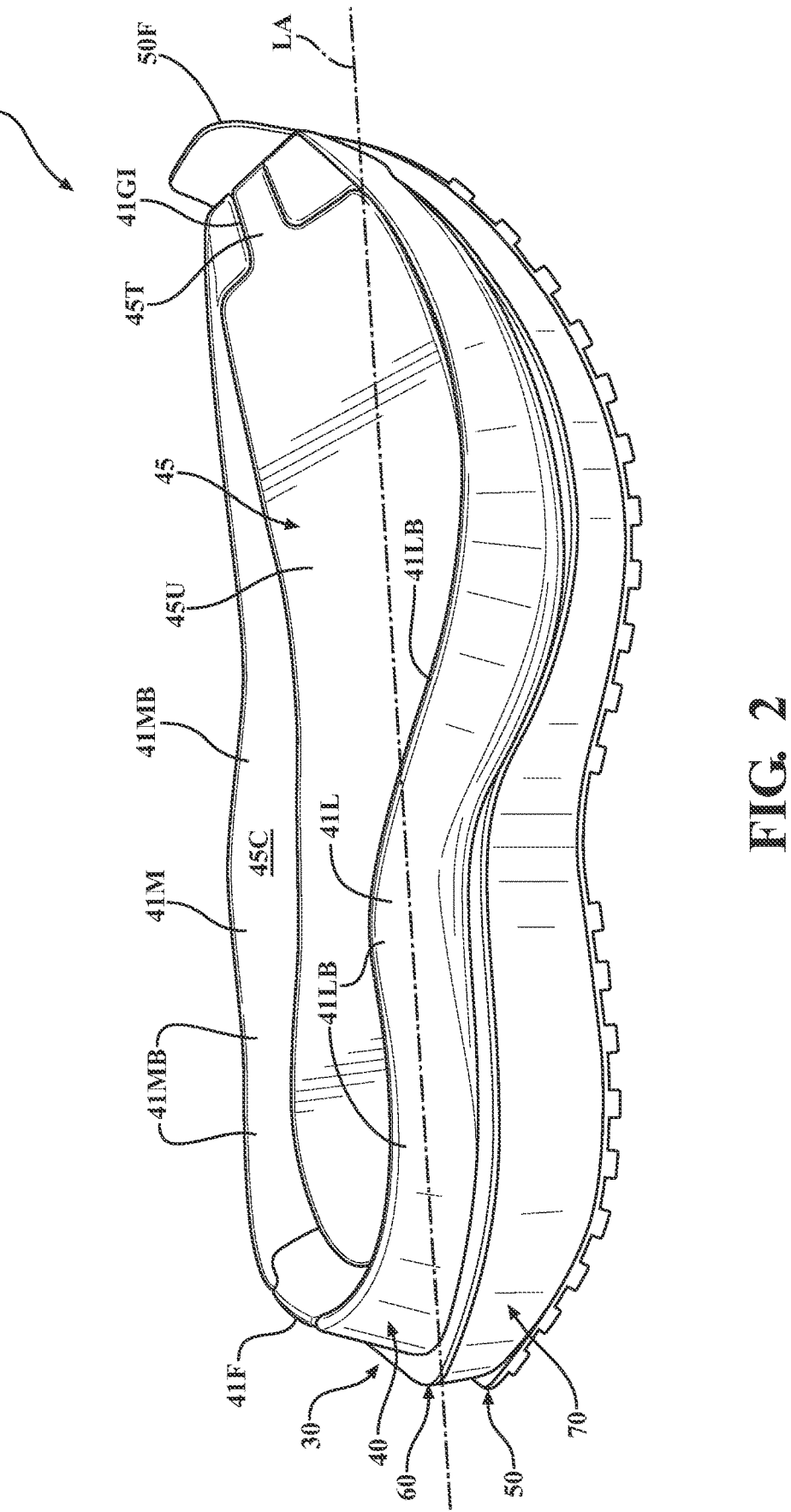
FIG. 2 is a side view of the sole assembly with an upper removed therefrom showing a portion of a midsole of the sole assembly.
Figure 3:
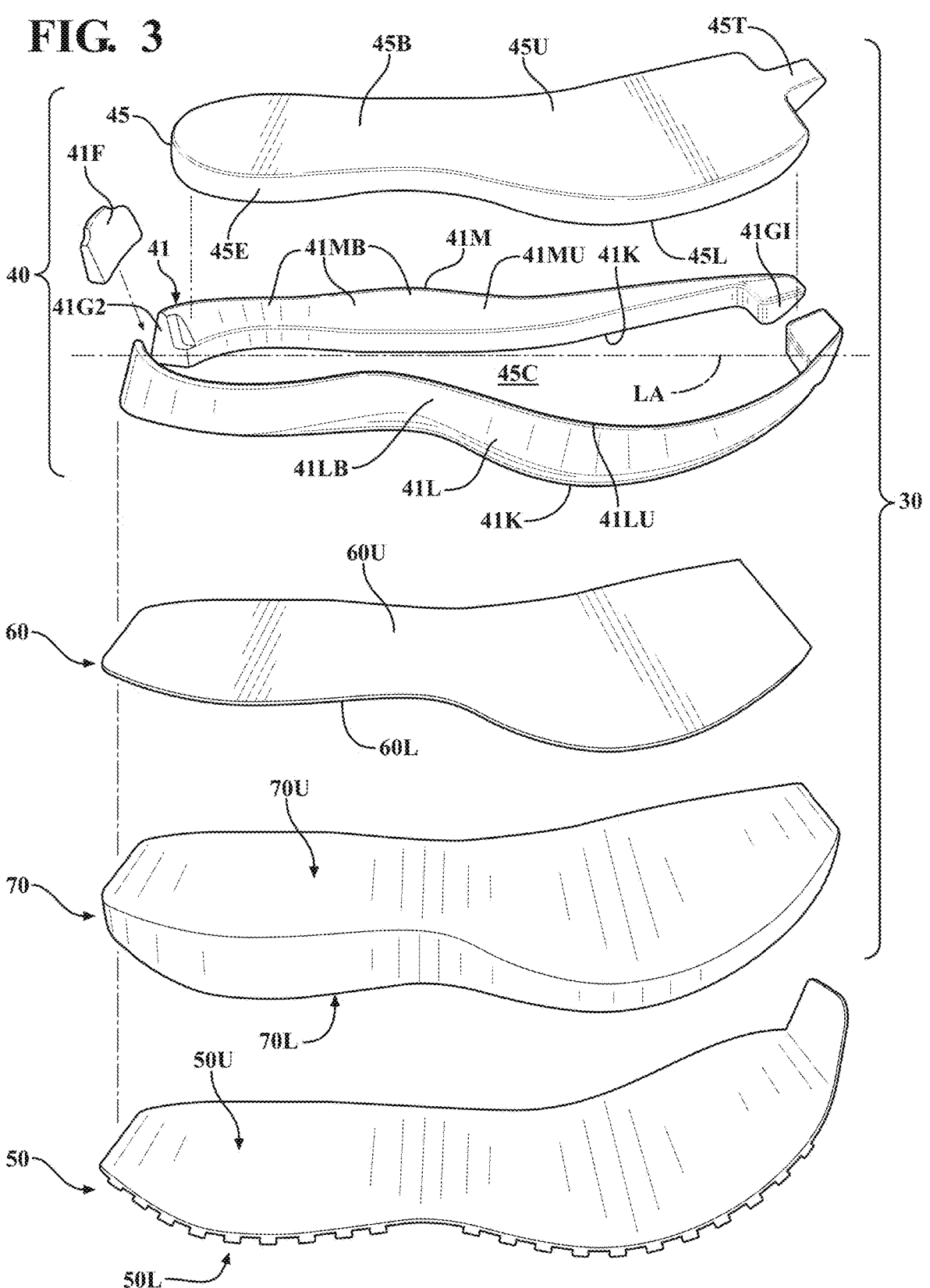
FIG. 3 is an exploded view of the sole assembly with the upper removed.

The sole assembly 20 will now be described in further detail with reference to FIGS. 1-4. FIGS. 2 and 3 show the sole assembly 20 separated from the upper 14 for clarity. The sole assembly 20 of the illustrated embodiment can include a primary midsole 40 having a compression molded core 45, which can be disposed in a compartment 45C bounded by one or more midsole support walls 41M and 41L, a plate 60, a secondary midsole 70 and an outsole 50 (as perhaps best shown in the exploded view of FIG. 3). The plate 60 can be disposed between the primary midsole 40 and optional secondary midsole 70.

The midsole 30, and in particular, the primary midsole 40 can be constructed to include the compression molded core 45. With reference to FIGS. 2-4, the midsole 40 can include a midsole support wall 41 that can surround a portion and/or all of a compartment 45C of the midsole. The midsole support wall 41 optionally can comprise one or more components. For example, as shown in FIG. 3, the midsole support wall 41 can include a midsole lateral support wall 41L and an opposing midsole medial support wall 41M that are disposed on opposite sides of the longitudinal access LA of the midsole 40. The midsole support walls 41M and 41L can extend along the longitudinal axis LA, optionally extending all or a portion of the full length L of the sole assembly. The walls can extend optionally through the respective heel region 13, arch region 12 and forefoot region 11.

These respective midsole support walls 41M and 41L, however, optionally can be disconnected from or separated from one another in the forefoot region 11 and/or the heel region 13 via openings or gaps 41G1, 41G2 therebetween. These gaps optionally can be closed by different portions of the midsole. For example, in the heel region 13, the gap 41G2 can be closed via a filler component 41F, which optionally can be constructed from the same material as the respective midsole support walls 41M and 41L. The filler component can be adhered or cemented to the midsole support walls in the heel region. In the forefoot region, the gap 41G1 optionally can be filled by a filler tab 45T that extends forwardly from the compression molded core 45. Of course, in other alternative embodiments, the midsole support wall 41 can be continuous and can extend all the way around the outer perimeter of the compartment 45C, optionally surrounding entirely the free edge 45E of the core 45.

With further reference to FIGS. 3 and 4, the midsole medial support wall 41M can include an upper portion 41MU, and the midsole lateral support wall 41L can include an upper portion 41LU. Each of these respective upper portions can form a respective first bite line 41MB and a second bite line 41LB. These bite lines can extend upwardly and optionally can taper from a base thickness T2 to a lesser or nominal thickness T1 atop the sidewalls, at the uppermost portion of each of the respective midsole medial support wall 41M and the midsole lateral support wall 41L. These bite lines can diminish in thickness from the lower portion of each of the respective midsole support walls to the uppermost portion of each of the respective support walls located near the respective first and second bite lines 41MB and 41LB.

As shown further in FIG. 4, the bite lines 41MB and 41LB, as well as the upper portions 41MU and 41LU of the respective midsole sidewalls can extend upwardly, above the upper surface 45U of the compression molded core 45 in the finished footwear. Optionally, the upper portions 41MU and 41LU can extend upwardly, at least above the upper core surface 45U by a height H2 that is greater than the height H1 of the core 45 itself, for example, in the heel region 13 and/or a portion of the arch region 12 of the footwear.

The midsole support wall 41 and its components can be constructed from a variety of abrasion resistant and durable materials. For example, the midsole support wall can be constructed from open or closed cell foams. In some cases, the midsole support wall can be constructed from EVA (ethyl vinyl acetate), TPU (thermoplastic polyurethane), PE (polyethylene), SBR (styrene butadiene rubber), PU (polyurethane), Latex and/or Neoprene. Further optionally, the midsole support wall can be constructed from a first foam having a first durometer hardness, referred to as durometer herein. This first durometer can be optionally 5 Asker C to 65 Asker C, inclusive, 45 Asker C to 65 Asker C, inclusive, 35 Asker C to 45 Asker C, inclusive, 30 Asker C to 50 Asker C, inclusive, 30 Asker C to 70 Asker C, inclusive, 50 Asker C to 70 Asker C, inclusive, 50 Asker C to 65 Asker C, inclusive, 50 Asker C to 60 Asker C, inclusive, or about 45 Asker C to about 50 Asker C inclusive. The hardness or durometer of any materials described herein as a particular type Asker C can be measured via ASTM D2240 standard, which is hereby incorporated by reference in its entirety.

The midsole lateral support wall 41L and the midsole medial support wall 41M, as shown, for example, in FIG. 4, can be secured to the allowance 16 and/or the lower portion 15L or side walls 15S of the upper 14. This provides a connection between the midsole 40 and generally the sole assembly 20 with the upper 14. Optionally, these midsole support walls 41, and in particular the first bite line 41MB and the second bite line 41LB, can extend upward along the allowance, lower portion and/or side wall, and can be secured thereto within an adhesive, cement or glue, or can be directly attached, molded, fused to or otherwise joined with the upper and the lower peripheral allowance 16 or other portions of the upper, instead of the compression molded core 45. This attachment via the midsole support wall rather than the core is suitable because the material from which the midsole support wall 41 is constructed is and can be more tear resistant, more durable and generally less elastic than the material from which the compression molded core 45 is constructed. As described below, the compression molded core 45 can have a lower tensile strength, and a lower split tear value than the midsole support wall 41. Accordingly, the core 45 can be somewhat less suitable for connecting the sole assembly to the upper 14 and providing a durable, long-lasting connection between those elements. Thus, the support wall, constructed from a different material than the compression molded core, can be suitable in the current embodiment to provide an adequate connection between the upper 14 and the sole assembly 20.

Optionally, the midsole support wall 41 can have a first tear strength that is greater than a second tear strength of the compression molded core 45. For example, the first tear strength can be optionally greater than 8 kg/cm, greater than 5 kg/cm, greater than 3 kg/cm, greater than 2.5 kg/cm or greater than 2 kg/cm. The second tear strength of the compression molded core can be less than 3 kg/cm, less than 2.5 kg/cm, less than 2.0 kg/cm, less than 1.75 kg/cm, or less than 1.5 kg/cm. The tear strength of any of the materials herein can be determined and tested via a foam tear strength test ASTM D3574 F which is incorporated by reference herein in its entirety.

The midsole lateral support wall 41L and midsole medial support wall 41M as mentioned above can form a compartment 45C therebetween. Within this compartment, the compression molded core 45 can be disposed as shown in FIGS. 3 and 4. The compression molded core 45 can include an upper surface 45U, a lower surface 45L, and a free edge 45E that can extend around the periphery of the main body 45B of the core 45. The free edge as shown can approximate the shape or outline of the upper, the Strobel board or generally the shape of a foot. Optionally, the free edge 45E can extend the full width W and the full length L of the sole assembly, with some minor deductions for portions of the midsole sidewall that extend outward and away from the free edge 45E. The free edge also can include an extension or tab 45T that extends outward from the body 45B in the forefoot. This tab 45T, as mentioned above, can be disposed within the gap 41G1 located between adjacent midsole support walls 41L and 41M in the forefoot to close off that gap. A flap 50F of the sole 50 can extend upward and conceal a forward portion of the tab 45T.

As mentioned above, and shown in FIG. 4, the core 45 can include a height H1. This height H1 can be less than a height of a sheet of material from which the core is constructed due to compression of the sheet of material. For example, before compression of the sheet in a mold to form the core, the height of the sheet from which the core is constructed can be greater than the height H1. After compression, the height of the sheet can be reduced to that height H1 as shown in FIG. 4. The height, overall width and overall length of the core 45 can be reduced due to compression molding, optionally by at least 2%, by at least 5%, or by at least 10%.

The compression molded core as mentioned above can be constructed by compression molding a sheet of raw material, to form the core and optionally die cutting the compressed compression molded core to approximate a foot and/or the compartment 45C of the midsole 40. Of course, the configuration, size and dimensions of the core 45 can vary, thus the core 45 can be likewise trimmed, cut, shaped or otherwise fit into the core compartment to fill the void formed by that compartment. The compression molded core 45 can be formed by compressing a second foam such that the second foam transitions from a first density to a second density that is greater than the first density. The compression molded core 45 can retain the second density when it is disposed in the compartment 45C of the midsole 40 and generally installed in the sole assembly 20 and the footwear 10 in general.

The second foam of the compression molded core can be initially provided in a flat sheet or roll form. The second foam optionally can be a closed or open cell foam, constructed from thermoplastic polyester elastomers (TPEE). Exemplary, but non-limiting, thermoplastic polyester elastomers, including thermoplastic copolyesters, that can be used in the current embodiments can include "HYTREL" 3078, "HYTREL" 4068, and "HYTREL" 4556 (commercially available from DuPont, Wilmington, Delaware, USA); "PELPRENE" P30B, P40B, and P40H (commercially available from Toyobo U.S.A. Inc., New York, New York, USA) and others.

The core 45 can have a second durometer, or more particularly, an Asker C durometer hardness of optionally 20 Asker C to 60 Asker C, inclusive, 25 Asker C to 35 Asker C, inclusive, 20 Asker C to 30 Asker C, inclusive, 25 Asker C to 30 Asker C, inclusive, 30 Asker C to 50 Asker C, inclusive, 22 Asker C to 25 Asker C, inclusive, 20 Asker C to 25 Asker C, inclusive, 22 Asker C to 27 Asker C, inclusive, 35 Asker C to 45 Asker C, inclusive, 30 Asker C to 45 Asker C, inclusive, 20 Asker C to 35 Asker C, inclusive, about 25 Asker C, about 20 Asker C, about 30 Asker C, or other durometers, when determined using the above noted ASTM testing for durometer hardness. The second durometer of the second foam of the compression molded core can be less than the first durometer of the first foam of the midsole support sidewalls.

The core can have a tensile strength or tensile modulus, for example when constructed from TPEE or other materials, of optionally 1.00 MPa to 3.0 MPa, inclusive, 1.5 MPa to 2.5 MPa, inclusive, 1.5 MPa to 2.0 MPa, inclusive, about 1.75 MPa, or about 1.73 MPa. The tensile modulus of any of the materials herein can be determined and tested via a foam tensile strength test ASTM D3574 E which is incorporated by reference herein in its entirety. The tensile strength of the core can be less than a tensile strength of the midsole support sidewalls. The core can have a percent elongation at break, for example, when constructed from TPEE or other materials, of optionally between 300% and 400%, inclusive, between 325% and 375%, inclusive, about 350% or about 356%. The core can optionally include a compression set of optionally 50% to 70%, inclusive, 55% to 65%, inclusive, about 60%, or about 61%.

The composition or material of the core 45 of the current embodiments optionally can include one or more additives. The additive can be incorporated directly into the core or TPEE or applied thereto. Suitable additives can include but are not limited to, dyes, pigments, colorants, ultraviolet light absorbers, amine light stabilizers, processing aids or agents, plasticizers, lubricants, emulsifiers, optical brighteners, rheology additives, catalysts, flow-control agents, slip agents, crosslinking agents, crosslinking boosters, flameproofing agents, antistatic agents, fillers, or mixtures of two or more of the foregoing. An additive can be present in an amount from about 0.1 weight percent to about 10 weight percent, or from 0.1 to 6 weight percent, based on the total weight of the composition or material, or any weight percent value or set of weight percent values within any of the foregoing ranges of weight percent, or any range of weight percent values encompassing a sub-set of any of the foregoing ranges. Further optionally, the additive can be present in the composition or material in an amount from about 0.1 weight percent to about 4 weight percent, based on a total weight of the composition or material. The composition or material can comprise less than 4 weight percent, or less than 3 weight percent, or less than 2 weight percent of additives, based on a total weight of the composition or material. In other cases, the composition or material can be essentially free of additives.

The core 45 as mentioned above can have particular densities before and after compression molding thereof to produce a compression molded core. In particular, the density of the material, in sheet, roll or other form, from which the core is produced, can be increased during compression molding. Density can be measured using ASTM D1817 standard, which is hereby incorporated by reference in its entirety. As an example, the core can be produced by providing a flat sheet or roll of a material, for example, a sheet of TPEE foam. This material can be placed in a mold initially and can have a first density. The first density can be optionally between 0.04 g/cm³ and 0.08 g/cm³, inclusive, between 0.045 g/cm³ and 0.085 g/cm³, inclusive, between 0.055 g/cm³ and 0.085 g/cm³, inclusive between 0.055 g/cm³ and 0.08 g/cm³, inclusive, between 0.04 g/cm³ and 0.085 g/cm³, inclusive, about 0.05 g/cm³, about 0.06 g/cm³, about 0.07 g/cm³, about 0.08 g/cm³ or about 0.085 g/cm³. The material can be pressed in a mold cover between mold plates, which optionally can include surface undulations, contours, patterns, projections or other surface features to impart to the core, or in some cases which plates can be simply flat and planar. As the material is compressed, optionally without the application of heat, and optionally via cold compression molding, it increases in density to a second density. The second density can be greater than the first density. The second density can be optionally between about 0.09 g/cm³ and 0.15 g/cm³, inclusive, between about 0.10 g/cm³ and 0.15 g/cm³, inclusive, between about 0.10 g/cm³ and 0.12 g/cm³, inclusive, between about 0.11 g/cm³ and 0.13 g/cm³, inclusive, between about 0.12 g/cm³ and 0.13 g/cm³, inclusive, about 0.10 g/cm³, about 0.11 g/cm³, less than 0.12 g/cm³ or less than 0.11 g/cm³. Optionally, the second density can be at least 10% greater than the first density, at least 15% greater than the first density, at least 20% greater than the first density, between about 10% and 25% greater than the first density, or between about 10% and 20% greater than the first density. After the compression molding process is complete, the compression molded core is formed from the material, for example, the TPEE foam and can retain the second density or something very close to that second density after the compression molded core is removed from the mold.

Surprising and unexpected results were obtained when the core was constructed via compression molding a TPEE material from a lesser density to a greater density, then incorporating that compression molded core into a sole assembly of a footwear, particularly in relation to energy efficiency. For example, most TPEE foams are known for their compressibility, which in turn provides cushion due to the relatively low density of TPEE foams. Energy efficiency or energy return denotes the amount of energy a footwear construction is able to retain when force is exerted upon it by a footwear wearer's stride. Generally, footwear that returns all the energy imparted upon it during a stride will score 100%, which is unattainable. Most shoes with traditional EVA foam midsoles tend to be around 70% to 80% energy efficient. Some newer eTPU and PEBA foams have an energy return or energy efficiency of around 80%. Thus, about 20% of the energy that sinks into footwear with those midsoles is lost to heat.

In the current embodiment, however, when the first density was increased to the second density, optionally via cold compression molding, the resultant compression molded core exhibited an increase in energy return and energy efficiency, so that the energy return or energy efficiency of the footwear with the compression molded core as described herein was about 96%. This was the opposite of what was expected, which was a decrease in energy return and energy efficiency to a lower level of generally less than 90%. In particular, it was expected that by increasing the density of the TPEE material, for example TPEE foam, that material would become less elastic, and less springy because the cell structure became more compressed and less likely to provide rebound and energy return. In contrast, the increased density increased energy return to the aforementioned 96%, which again was unexpected and counterintuitive because the material had been compressed and made denser which theoretically should have reduced energy efficiency rather than increased it to the relatively high levels of at least 95%.

Of course, as mentioned above, the compression molded core, although having increased energy efficiency and energy return, still maintained the negative attributes of the TPEE foam material, which again are poor abrasion resistance, and being prone to tearing and/or damage. As a result, this core did not make a suitable material that can be exposed in the normal use of footwear. Accordingly, the sole assembly was implemented with the midsole support wall to protect the core and yet still provide the core's energy efficiency in the footwear, under the user's foot. Incidentally, the harder midsole support walls were not implemented or positioned directly under a user's foot or the Strobel board, so that those sidewalls would not substantially absorb the forces due to the wearer's foot during a stride. If those sidewalls did do this, they might negatively impact energy return because the midsole sidewall material, when EVA or a variant, likely would only provide about 80% energy return.

With reference to FIG. 4, the compression molded core 45 can be disposed within the core compartment 45C bounded by the midsole support walls 41M and 41L. The core 45 generally can be disposed below the Strobel board 17. In some cases, the upper surface 45U of the core 45 can contact the lower surface 17L of the Strobel board distal from the upper surface 17U thereof. In some cases, the lower surface 17L of the Strobel board can be adhered, cemented or otherwise secured or fastened to the upper surface 45U of the core 45. The upper surface 45U also can be joined with the inwardly transitioning portions 16P of the lower peripheral allowance 16. Generally, the upper surface 45U can remain disposed below the bite lines 41MB and 41LB of the support walls. Optionally, the Strobel board can engage and contact the compression molded core 45 below the first bite line and below the second bite line. Further optionally, when placed within the compartment 45C and surrounded by the midsole support walls 41, below the Strobel board, the compression molded core 45, the body of the core 45 thereof, and the free edge 45E can be concealed, covered and/or protected, for example, by the midsole support walls 41 or another similar structure of the sole assembly extending around the free edge. In turn, the core is protected from the environment and thus abrasion, tearing or damage thereto.

As shown in FIGS. 1-4, the sole assembly 20 can include a plate extending from the forefoot region toward the heel region, optionally through the arch region. This plate can be constructed from carbon, nylon polymers and/or combinations thereof. The plate can be substantially rigid and consistent across the width W and along the length L of the sole assembly. Although shown as a full plate, the plate 60 can be a partial plate and can extend only part way across the width and/or part way along the length L, for example, only in the forefoot region and/or the arch region or only in the heel region and arch region, or only in the arch region to act as a shank or arch support. The plate can include a plate upper surface 60U and a plate lower surface 60L. The plate upper surface 60U can engage, contact and/or be secured to the core lower surface 45L, as well as the lower surfaces 41K of the respective midsole support walls 41m and 41L. The plate 60 can form a bottom or lower portion of the compartment 45C depending on the application. The compression molded core 45 and the plate 60 optionally can function in a synergistic manner with one another to provide the increased energy return and energy efficiency, depending on the application.

As shown in FIGS. 1-4, the sole assembly 20 optionally can include the secondary midsole 70 and an outsole 50. The secondary midsole 70 can be disposed below the plate 60. The secondary midsole can include a secondary midsole upper surface 70U that contacts, engages and/or is secured to the plate lower surface 60 L. The secondary midsole 70 also can include a secondary midsole lower surface 70L opposite the secondary midsole upper surface 70U. The outsole 50 can contact, engage and/or be joined with the secondary midsole lower surface. Of course, in certain applications, the plate 60 and secondary midsole 70 can be absent from the footwear construction 10. The secondary midsole 70 as shown can be constructed from the same material from which the midsole support wall is constructed and can have similar properties as described above. Generally, the secondary midsole 70 can have a third durometer that is greater than the second durometer of the core. It also can have a greater tensile strength and tear strength when compared to the material of the core 45.

The outsole 50 can include an upper surface 50U and an opposing outsole lower surface 50L. The lower surface 50L can include the optional treads or lugs, and otherwise can form a ground contacting surface of the outsole 50. Optionally, the outsole layer 50 can define multiple openings (not shown) that extend from an outsole upper surface 50U to the outsole lower surface 50L. Such openings can be polygonal shaped recesses or openings as illustrated. Alternatively, the openings can be of other shapes, for example, circular, triangular, rectangular, ellipsoid or other geometric shapes. The outsole optionally can be of a substantially uniform thickness of optionally 0.5 mm to 4.0 mm, inclusive; further optionally 0.5 to 2.5 mm, inclusive; yet further optionally about 1.0 mm. With this thin outsole base, the outsole can be configured to directly transmit underfoot forces through the outsole to the plate and likewise transmit forces from the wearer's foot to the underfoot surface to promote efficient energy return of the sole assembly. The outsole upper surface 50U can be directly joined with the secondary midsole 70, and in particular its lower surface 70L, optionally via adhesives or other means as described herein.

A method of making a footwear construction 10 of the current embodiment will be briefly described here. The method generally can include compression molding a sheet or roll of a material, such as a foam, optionally constructed from a thermoplastic polyester elastomer to increase the density of the foam from a first density to a greater second density. Optionally, the density of the raw material or foam can be increased from a first density between 0.05 g/cm³ and 0.08 g/cm³, inclusive, to a second density between about 0.09 g/cm³ and 0.12 g/cm³, inclusive, thereby forming a compression molded core. After the compression molded core is formed, it can be trimmed, cut or otherwise shaped and placed within a compartment defined by a midsole.

The compartment can be defined by a midsole 40 of the sole assembly 20 and optionally surrounded by a midsole support wall 41. The midsole support wall can extend upward above a free edge 45E of the core 45 so as to conceal, cover and or protect the free edge. Even after placement in the compartment 45C, the compression molded core can retain the second density when disposed in that compartment.

Where the midsole support wall 41 is constructed from one or more different support wall sections, such as the midsole medial support wall and the midsole lateral support wall, those support walls can be installed relative to one another and any supporting components, for example, the filler component 41F shown in FIG. 3, so as to create the core compartment 45C. In some cases, the midsole support walls can be joined with or adhered to the upper surface of the plate 60 as described to form the compartment. Thereafter, the core 45 can be seated within the compartment to provide a good fit between the midsole support wall 41 and the core 45.

The core lower surface 45L optionally can be covered by an outsole as described herein, or the plate 60, secondary midsole 70 and outsole 50 as also described herein. In particular, the plate can be joined with the core lower surface. The plate can include the plate upper surface and plate lower surface. The plate upper surface can contact and engage the core lower surface and can cover the core lower surface as described above.

Where a secondary midsole 70 is included, the secondary midsole can be positioned below the plate 60 and can include the secondary midsole upper surface 7DU. The plate lower surface 60L can contact the secondary midsole upper surface 70U. These two components can be joined with one another, optionally via an adhesive cement or other fastening means.

A first alternative embodiment of the footwear and sole assembly is shown in FIGS. 5-9 and generally designated 120. This sole assembly 120 can be similar and/or identical to the sole assembly 20 described above in structure, function and operation with several exceptions. For example, the sole assembly can be secure to the upper 114 and can include a midsole 130 having a compression molded core 145, which can be partially disposed in a compartment 145C bounded by one or more midsole support walls 141M and 141L of the primary midsole, a plate 160 and an outsole 150. The plate 160 can be a three quarter or half-length plate and can be disposed between the primary midsole 140 and the core 145, above the optional outsole which can include outsole parts 150F and 150H, where the lower surface of the primary midsole 140 forms a portion of the ground contacting surface 140G of the sole assembly along with the outsole parts 150F and 150H.

The midsole 130 and in particular the primary midsole 140 with its walls 141M and 141L as described below can be constructed from the same material and have the same properties as the midsole and support wall 41 as described fully above. For example, these components can be constructed from EVA (ethyl vinyl acetate), TPU (thermoplastic polyurethane), PE (polyethylene), SBR (styrene butadiene rubber), PU (polyurethane), Latex and/or Neoprene. Further optionally, the midsole support wall can be constructed from a first foam having a first durometer hardness, referred to as durometer herein. This first durometer can be optionally 5 Asker C to 65 Asker C, inclusive, 45 Asker C to 65 Asker C, inclusive, 35 Asker C to 45 Asker C, inclusive, 30 Asker C to 50 Asker C, inclusive, 30 Asker C to 70 Asker C, inclusive, 50 Asker C to 70 Asker C, inclusive, 50 Asker C to 65 Asker C, inclusive, 50 Asker C to 60 Asker C, inclusive, or about 45 Asker C to about 50 Asker C inclusive. The hardness or durometer of any materials described herein as a particular type Asker C can be measured via ASTM D2240 standard, which is hereby incorporated by reference in its entirety. The primary midsole 140 and its walls also can be constructed from a material that can have a first tear strength that is greater than a second tear strength of the compression molded core 145. For example, the first tear strength can be optionally greater than 8 kg/cm, greater than 5 kg/cm, greater than 3 kg/cm, greater than 2.5 kg/cm or greater than 2 kg/cm. The second tear strength of the compression molded core can be less than 3 kg/cm, less than 2.5 kg/cm, less than 2.0 kg/cm, less than 1.75 kg/cm, or less than 1.5 kg/cm. The tear strength of any of the materials herein can be determined and tested via a foam tear strength test ASTM D3574 F which is incorporated by reference herein in its entirety.

The compression molded core 145 as described below can be constructed from the same second foam material and have the same properties as the core 45 as described fully above. For example, the core 145 can be a second foam which can be a closed or open cell foam, constructed from thermoplastic polyester elastomers (TPEE). Exemplary, but non-limiting, thermoplastic polyester elastomers, including thermoplastic copolyesters, that can be used in the current embodiments can include "HYTREL" 3078, "HYTREL" 4068, and "HYTREL" 4556 (commercially available from DuPont, Wilmington, Delaware, USA); "PELPRENE" P30B, P40B, and P40H (commercially available from Toyobo U.S.A. Inc., New York, New York, USA) and others.

The core 45 can have a second durometer, or more particularly, an Asker C durometer hardness of optionally 20 Asker C to 60 Asker C, inclusive, 25 Asker C to 35 Asker C, inclusive, 20 Asker C to 30 Asker C, inclusive, 25 Asker C to 30 Asker C, inclusive, 30 Asker C to 50 Asker C, inclusive, 22 Asker C to 25 Asker C, inclusive, 20 Asker C to 25 Asker C, inclusive, 22 Asker C to 27 Asker C, inclusive, 35 Asker C to 45 Asker C, inclusive, 30 Asker C to 45 Asker C, inclusive, 20 Asker C to 35 Asker C, inclusive, about 25 Asker C, about 20 Asker C, about 30 Asker C, or other durometers, when determined using the above noted ASTM testing for durometer hardness. The second durometer of the second foam of the compression molded core can be less than the first durometer of the first foam of the midsole support sidewalls. The core 145 also can include the same or similar tensile modulus, elasticity and additives as the core 45 above which will not be described again here.

The core 145 also can have particular densities before and after compression molding thereof to produce a compression molded core, similar to the core 45 above. In particular, the density of the material, in sheet, roll or other form, from which the core is produced, can be increased during compression molding. Density can be measured using ASTM D1817 standard, which is hereby incorporated by reference in its entirety. As an example, the core can be produced by providing a flat sheet or roll of a material, for example, a sheet of TPEE foam. This material can be placed in a mold initially and can have a first density. The first density can be optionally between 0.04 g/cm$^3$ and 0.08 g/cm$^3$, inclusive, between 0.045 g/cm$^3$ and 0.085 g/cm$^3$, inclusive, between 0.055 g/cm$^3$ and 0.085 g/cm$^3$, inclusive between 0.055 g/cm$^3$ and 0.08 g/cm$^3$, inclusive, between 0.04 g/cm$^3$ and 0.085 g/cm$^3$, inclusive, about 0.05 g/cm$^3$, about 0.06 g/cm$^3$, about 0.07 g/cm$^3$, about 0.08 g/cm$^3$ or about 0.085 g/cm$^3$. The material can be pressed in a mold cover between mold plates, which optionally can include surface undulations, contours, patterns, projections or other surface features to impart to the core, or in some cases which plates can be simply flat and planar. As the material is compressed, optionally without the application of heat, and optionally via cold compression molding, it increases in density to a second density. The second density can be greater than the first density. The second density can be optionally between about 0.09 g/cm$^3$ and 0.15 g/cm$^3$, inclusive, between about 0.10 g/cm$^3$ and 0.15 g/cm$^3$, inclusive, between about 0.10 g/cm$^3$ and 0.12 g/cm$^3$, inclusive, between about 0.11 g/cm$^3$ and 0.13 g/cm$^3$, inclusive, between about 0.12 g/cm$^3$ and 0.13 g/cm$^3$, inclusive, about 0.10 g/cm$^3$, about 0.11 g/cm$^3$, less than 0.12 g/cm$^3$ or less than 0.11 g/cm$^3$. Optionally, the second density can be at least 10% greater than the first density, at least 15% greater than the first density, at least 20% greater than the first density, between about 10% and 25% greater than the first density, or between about 10% and 20% greater than the first density. After the compression molding process is complete, the compression molded core is formed from the material, for example, the TPEE foam and can retain the second density or something very close to that second density after the compression molded core is removed from the mold.

In this embodiment, the primary midsole 140 and core 145 however, can be structurally configured differently from the embodiments above. For example, in this embodiment shown in FIGS. 6-9, although the core 145 is disposed in the core compartment 145C defined by the primary midsole 140, an upper portion 145E of the core 145 can be exposed and open to the environment above the midsole walls 141M and 141L of the midsole 140. This portion 145E can be constructed from the compression molded core material described above and can be more elastic and less tear resistant than the primary midsole 140 as described above. In some cases, this exposed portion 145E can be covered with a skin, coating, paint, film or other material to prevent marring, tearing or other damage to the exterior of the core exposed and unconcealed between the primary midsole 140 and the upper 114.

The core 145 also can include a lower portion 145L that is disposed below the upper portion 145E. This lower portion 145L can be fully disposed in the compartment 145C of the primary midsole 140 such that it is concealed, protected and unexposed to the environment. The lateral 141L and medial 141M support walls of the midsole 140 can extend upward along the lower portion 145L of the core 145, concealing that portion and protecting it. The walls can generally thin toward their uppermost edges, diminishing from a greater thickness to a lesser thickness as the walls extend upward.

Figure 7:
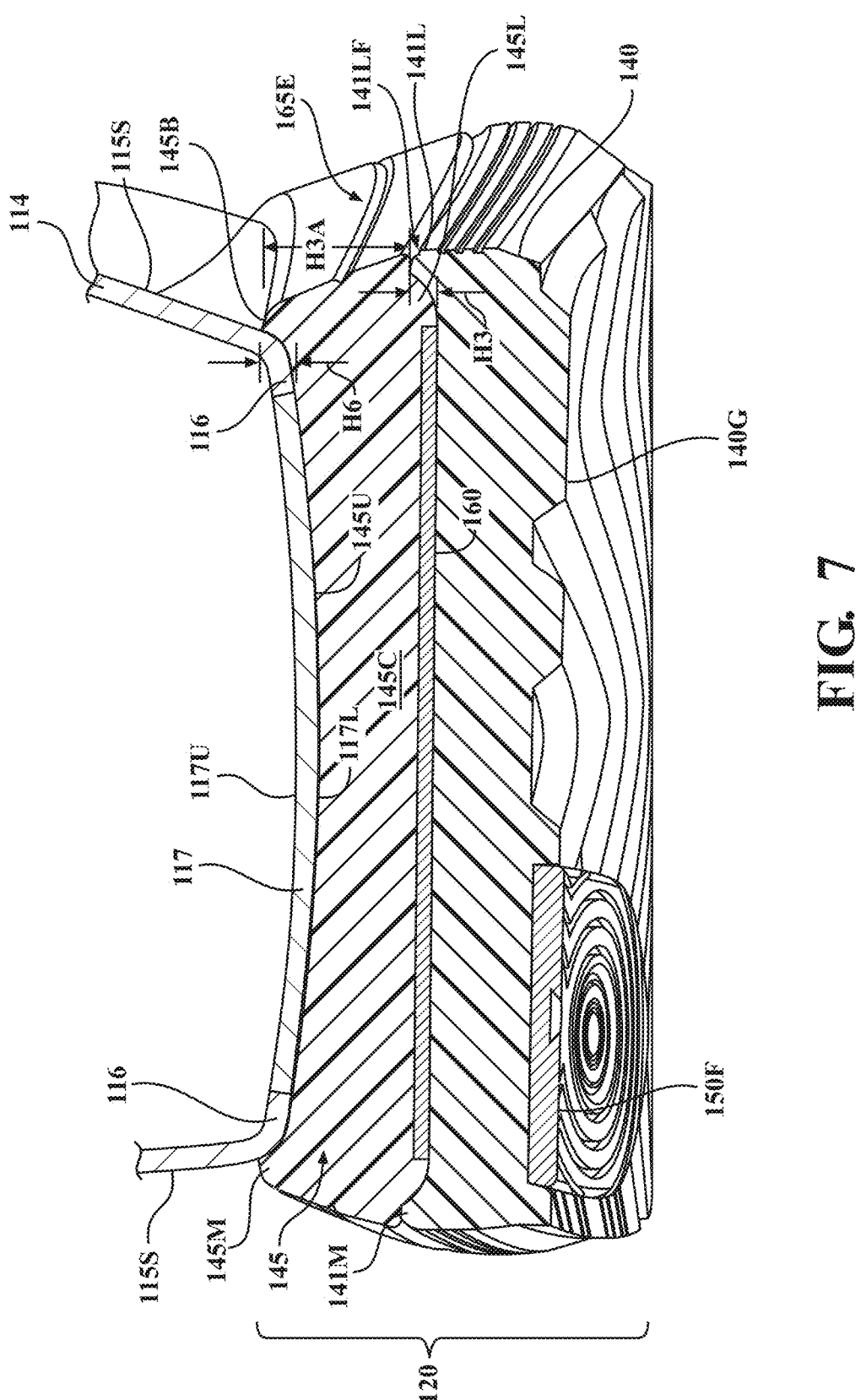
FIG. 7 is a section view thereof taken along line 7-7 in FIG. 5.

Similar to the embodiment above, the midsole support walls 141M and 141L can extend along the longitudinal axis, extending all or a portion of the full length of the sole assembly. The walls can extend optionally through the respective heel region 13, arch region 12 and forefoot region 11. Optionally, the midsole support walls 140L and 140M can vary in height along the length of the footwear from the forefoot region 11 to the heel region 13, providing different levels and amounts of protection for the lower portion 145L of the core 145 and thus exposing more or in some cases less or the same amount of the upper portion 145E of the core 145 above the respective walls 141L and 141M. For example, as shown in FIG. 7, which is a section view taken in the forefoot 11 of the footwear, the lateral wall 141L and medial wall 141M can be of a height H3. This height H3 can be optionally about 1 mm to about 10 mm, about 2 mm to about 8 mm, or about 5 mm. The upper portion 145E of the core, however, can extend to a height H3A above the upper edge 141LF of the wall 141L. This height H3A can be greater than the height H3 of the lower portion concealed by the midsole support walls 141L and 141M. In some cases, this height H3A can be about 2, 4, 6, 8, 10 or more times the height H3. Thus, more of the upper portion 145E can be exposed than the lower portion 145L is concealed, for example, in the forefoot portion of the footwear.

In this forefoot portion 11, the compression molded core 145 can include its own sidewalls 145B and 145M generally disposed above the respective midsole support walls 141L and 141M. These core sidewalls 145B and 145M in the upper portion can extend upward above the upper surface 145U of the core and can be joined with the upper 114 and an optional Strobel board 117. The upper and Strobel board of this embodiment can be similar or identical to the embodiment described above. The core sidewalls 145M and 145B shown in FIG. 7 can form respective bite lines that extend upwardly and along the side surfaces 115S of the upper. The core 145 can be glued, cemented, affixed or otherwise secured to the lower surface 117L of the Strobel board 117 as well as the peripheral allowances 116 of the upper. Optionally, the Strobel board can engage and contact the compression molded core 145 at the same level as the bite lines in the forefoot region 11.

Each of these respective sidewalls 145M and 145B can thin as they extend upward along the walls and side surfaces 115S. Each of these walls also can extend the height H6 above the upper surface 145U of the core that is disposed under the Strobel board 117 in the forefoot. This height H3 can be less than the heights H7 and H8 of the same walls in the arch and/or heel region of the footwear as described below.

Figure 10:
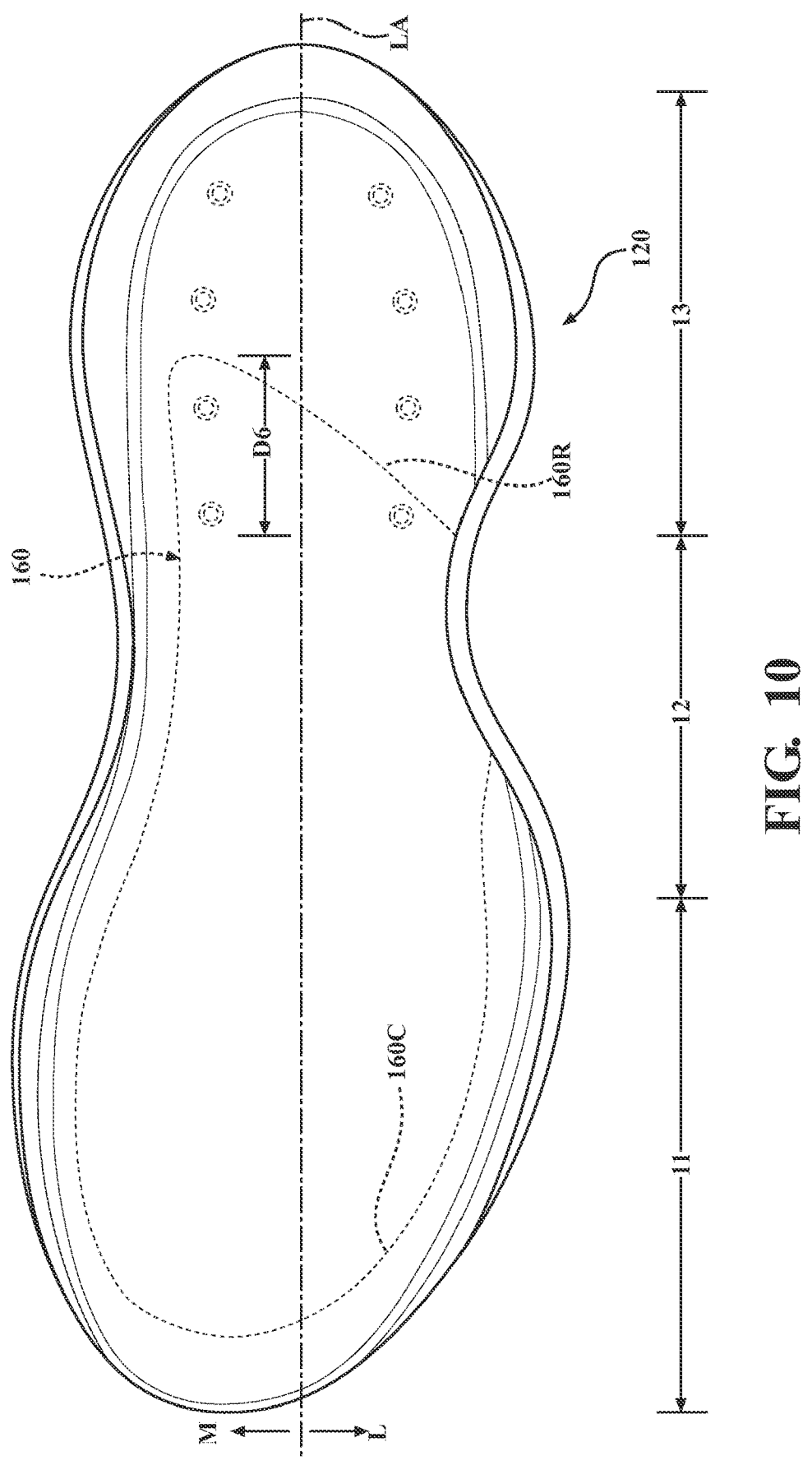
FIG. 10 is a top view thereof.
Figure 11:
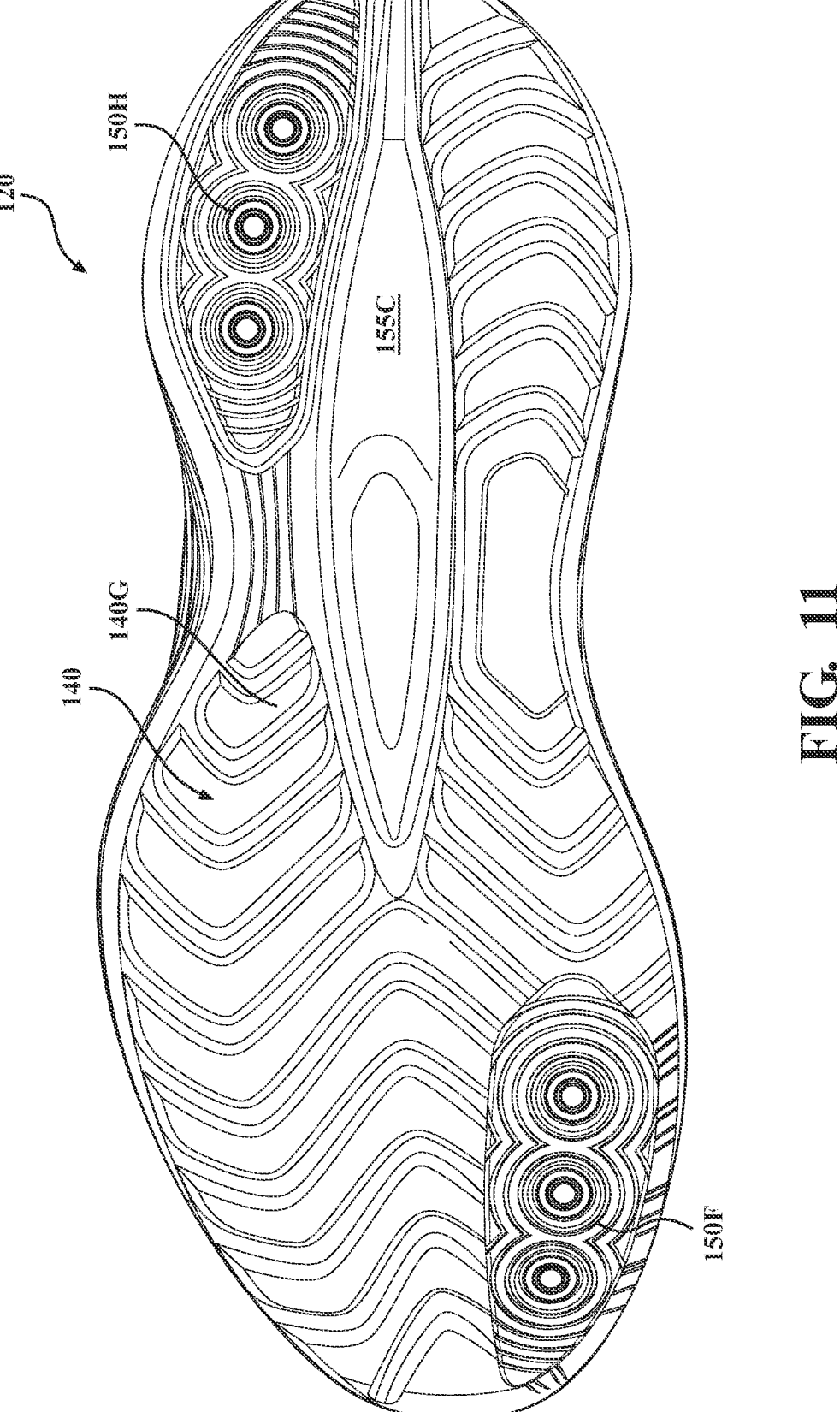
FIG. 11 is a bottom view thereof.

As mentioned above, the sole assembly 120 can include a plate 160. This plate 160 can be similar or identical to the plate described in the embodiment above and therefore will not be described again here. Suffice it to say that this plate 160 optionally can be a three quarter or half-length plate and can start in the forefoot region 11 and can extend to or into the heel region 13 of the footwear. In the forefoot region 11, the plate 160 can be curved, including a front curved edge 160C shown in FIG. 10. In this region, shown in FIG. 7, the plate 160 can extend across at least 75%, at least 85% or at least 90% the width of the sole assembly. The plate can be disposed between the lower surface of the core 145 and the upper surface of the primary midsole, between the lateral and medial support walls 141M and 141L. In the heel region 13, as shown in FIG. 10, the plate can include a rear edge 160R which can be angled so that the plate extends more rearward on the medial side M than on the lateral side L of the longitudinal axis LA of the sole assembly 120. Optionally, the plate 160 can be longer on the medial side M than the lateral side L. The plate 160 as shown can extend a distance D6 farther rearward on the medial side M than the lateral side L of the longitudinal axis LA of the footwear. Of course, the rear edge 160R of the plate 160 alternatively can extend along a straight or curved line that is transverse, for example perpendicular, to the longitudinal axis LA in the heel regional 13, or in some cases in the arch region 12. Optionally, in some applications, the plate 160 can be completely absent from the construction.

Figure 8:
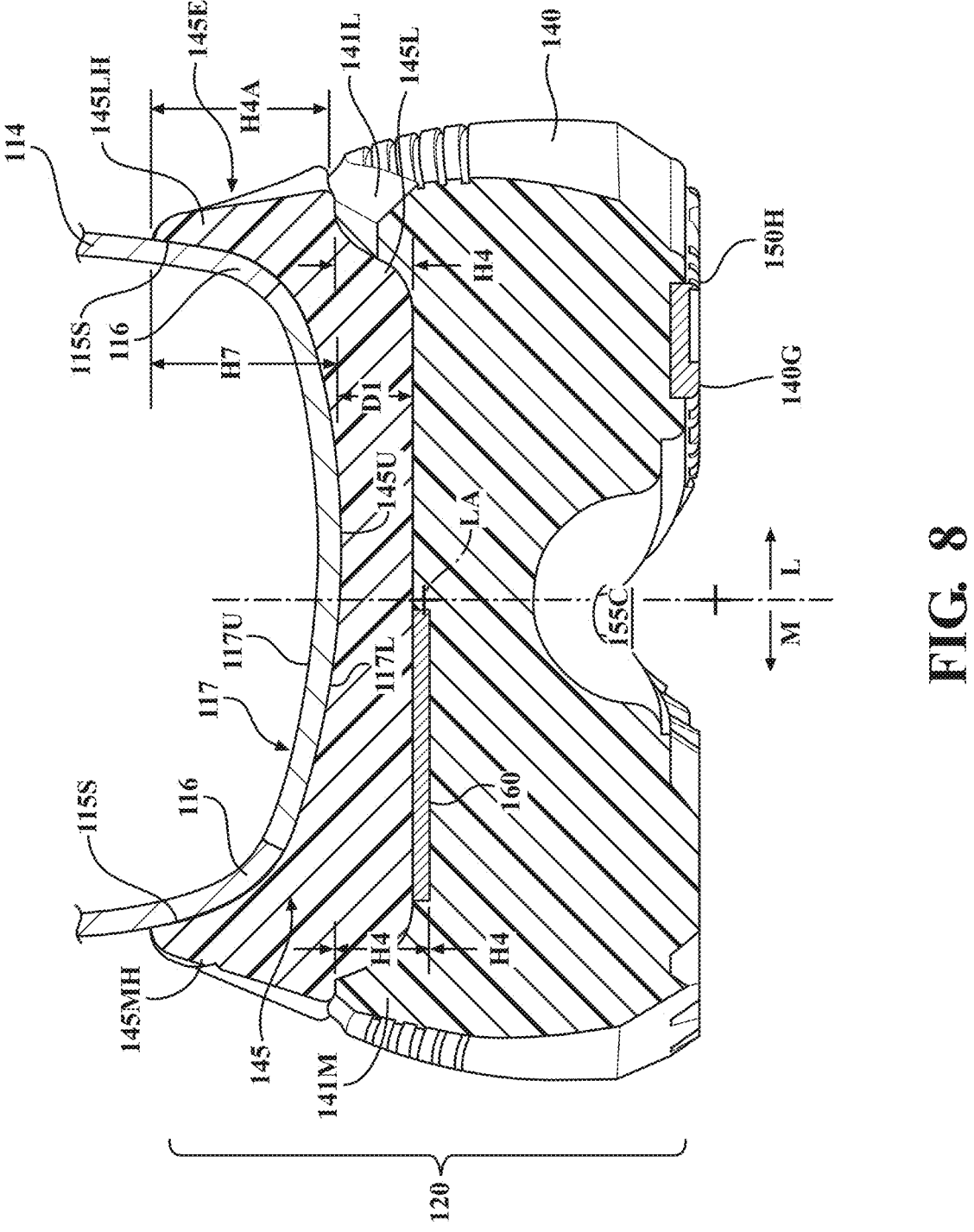
FIG. 8 is a section view thereof taken along line 8-8 in FIG. 5.

With reference to FIG. 8, the sole assembly 120 can be constructed so that the midsole support walls 141M and 141L surrounding the lower portion 145L of the compression molded core 145 can become greater in height in the heel region 13. For example, as shown in FIG. 8, the height of the midsole support walls 141L and 141M can be of a height H4. This height H4 can be greater than the height H3 of those walls that extend into the forefoot. The height H4A of the exposed or upper portion 145E of the core in the heel region shown in FIG. 8 can be closer to that of the height H4 as well. Optionally, height H4A can be about two or about four times the height H4. Further optionally, the heights H4 and H4A can be equal in this region, and the side walls 145LH and 145MH of the core also can become greater as the sole extends rearwardly into the heel. For example, the height H7 of these sidewalls from the upper surface 145U of the core under the Strobel board 117 can be greater than the height H4 of those core side walls in the fore forefoot. Optionally, the core side walls 145MH and 145LH can extend farther up the sides 115S of the upper and generally can extend farther above the Strobel board 117 disposed in the well or cup formed between these sidewalls 145MH and 145LH.

FIG. 8 also shows the plate 160 in the heel region, near a point of termination in the heel region 13. The heel plate is disposed primarily on the medial side M of the original axis LA in this section. The lateral side L of the sole assembly 120 does not include a substantial portion of the heel plate in this section. This can be because the rearward edge of the plate is angled across the width of the sole assembly 120 as shown in FIG. 10. Further optionally, with this construction of the plate, the medial side can be slightly stiffer and more rigid in the heel region 13 than the lateral side L of the sole assembly 120.

Farther rearward into the heel region the compression molded core 145 optionally can vary in depth from the lateral side L to the medial side M. For example, in FIG. 9, the core 145 can include a depth D2 on the lateral side L and a depth D3 on the medial side M. The depth D2 can be greater than the depth D3 as shown, or vice versa, or the depths can be equal. The depth D2 can correspond to a lobe or projection 145P on the lateral side L of the longitudinal axis LA. Optionally, the depth of the core can vary from one side L to the other side M, such that the depths are unequal on opposite sides of the longitudinal axis LA. The lobe 145P can provide slightly more cushion and energy return above the outsole part 150H on the lateral side L of the sole assembly. The lobe 145P also can result in a height H5 of the support wall 141LH on the lateral side L that is greater than the height H7 of the medial wall 141MH on the medial side M of the longitudinal axis. Of course, the heights and depths shown could be reversed in an alternative construction.

Optionally, in this region, the primary midsole 140 can define a recess or cavity 155C generally below the longitudinal axis LA that extends slightly on the lateral side L and medial side M of these sole assemblies. This recess 155C can extend upward from the ground contacting surface 140G of the primary midsole 140. This recess 155C can extend under the transition from the depth D3 of the core to the depth D2 of the core, where the lobe 145P generally begins near the longitudinal axis LA of the sole assembly 120.

Figure 9:
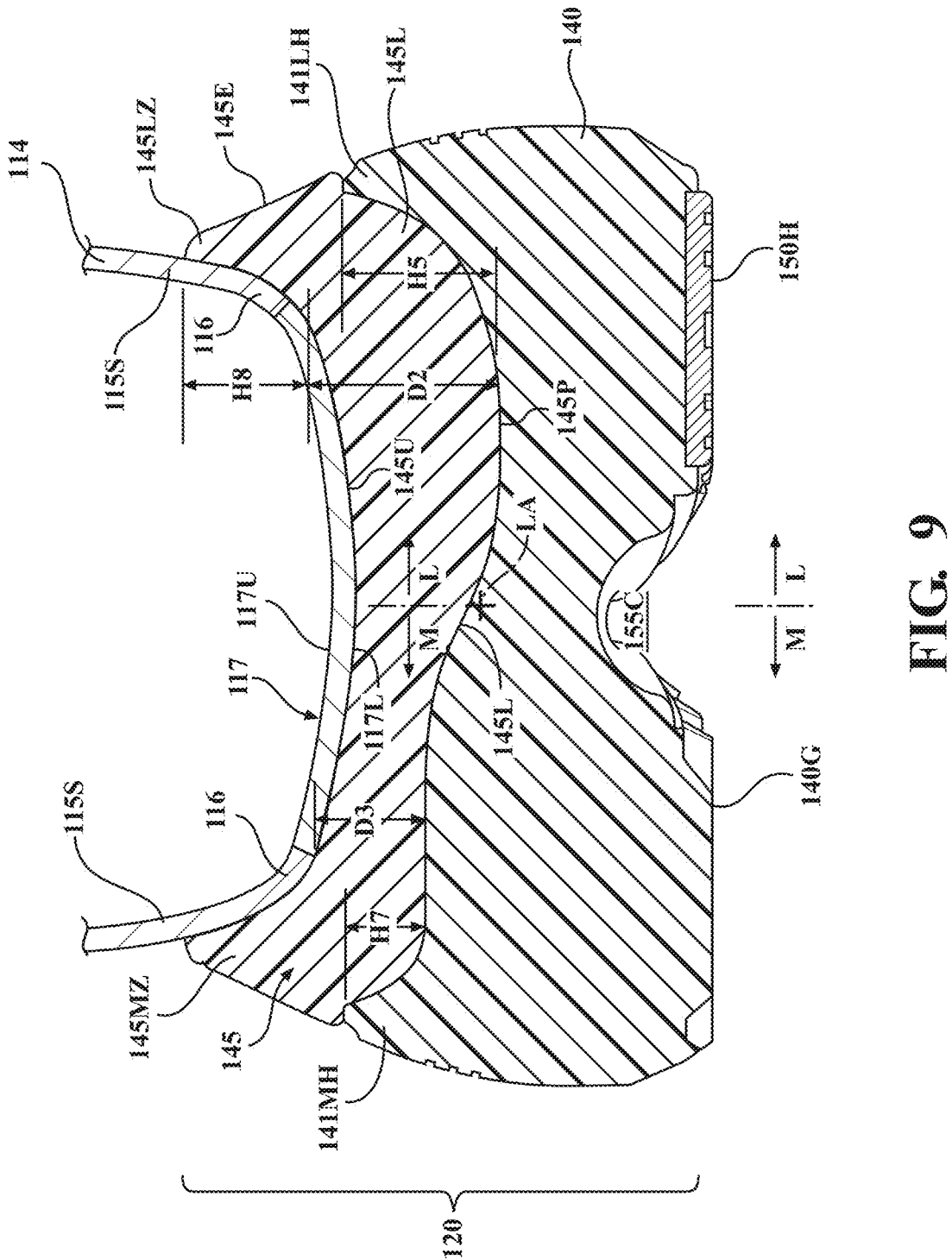
FIG. 9 is a section view thereof taken along line 9-9 in FIG. 5.

With further reference to FIG. 9, the core 145 and in particular the lower portion 145L of the core can be protected or concealed by the height H7 and H5, which can be different, on opposite sides longitudinal axis LA by the respective midsole support sidewalls 141MH and 141LH. The core upper portion 145E can extend upward above the respective support walls 141LH and 141MH approximately the same distance. The respective core sidewalls 145LZ and 145MZ can extend upwardly, along the sides 115S of the upper 114, effectively forming bite lines along which the compression molded core can be secured to the peripheral allowance 115. Thus here, the softer material of the core can form the bite line for attachment to the upper, rather than the midsole support walls. Optionally, in this construction, the primary midsole can be unattached to the upper, with the core being directly attached via gluing, cementing or other securement to the bite lines and the peripheral allowance and/or sidewalls of the upper. The Strobel board can be located below these sidewalls 145LZ and 145MZ and above the support sidewalls 141MH and 141LH in some applications.

The following Statements are included to provide further understanding of the current embodiments.

Statement A. A footwear construction comprising: an upper; a midsole including a midsole support wall forming a compartment under the upper, the midsole support wall being constructed from a first foam having a first durometer; a compression molded core including a lower portion disposed in the compartment and shielded from abrasion upon contact of the midsole with an object, and an upper portion disposed above the compartment and extending above a midsole support wall bounding the compartment, the compression molded core being constructed from a second foam having a second durometer that is less than the first durometer, the second foam comprising thermoplastic polyester elastomer, the compression molded core including a core upper surface and a core lower surface, wherein the compression molded core is formed by compressing the second foam such that the second foam transitions from a first density to a second density that is greater than the first density before placement of the core relative to the compartment, wherein the compression molded core retains the second density when the compression molded core is disposed in the compartment of the midsole.

Statement B. The footwear construction of Statement A wherein the first density is 0.08 g/cm$^3$, wherein the second density is 0.10 g/cm$^3$.

Statement C. The footwear construction of any preceding Statement, wherein the second foam has a tensile strength of about 1.73 MPa, wherein the second foam has a percent elongation at break of about 356%.

Statement D. The footwear construction of any preceding Statement, wherein the compartment is surrounded by a midsole support wall, wherein the support wall includes a height that increases from a forefoot region toward a heel region, wherein the compression molded core includes a compression molded core wall that forms a bite line around a peripheral allowance of the upper, wherein the compression molded core wall has a density of 0.10 g/cm$^3$ to 0.12 g/cm$^3$.

Statement E. The footwear construction of any preceding Statement, wherein the compression molded core wall is greater in height in the heel region than in the forefoot region. Although the different elements and assemblies of the embodiments are described herein as having certain functional characteristics, each element and/or its relation to other elements can be depicted or oriented in a variety of different aesthetic configurations, which support the ornamental and aesthetic aspects of the same. Simply because an apparatus, element or assembly of one or more of the elements is described herein as having a function does not mean its orientation, layout or configuration is not purely aesthetic and ornamental in nature.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to," or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate opera- tion. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might coop- eratively provide a collection of benefits. The present inven- tion is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. A footwear construction comprising:

an upper;

a midsole including a midsole support wall forming a compartment under the upper, the midsole support wall being constructed from a first foam having a first durometer;

a longitudinal axis bisecting the footwear construction into a lateral portion and a medial portion, the longi- tudinal axis extending along a length of the midsole, the length extending from a forefoot region to a heel region of the footwear construction; and a compression molded core disposed in the compartment and shielded from abrasion upon contact of the midsole with an object, the compression molded core being constructed from a second foam having a second durometer that is less than the first durometer, the second foam comprising thermoplastic polyester elas- tomer, the compression molded core including a core upper surface and a core lower surface, wherein the compression molded core is formed by com- pressing the second foam such that the second foam transitions from a first density to a second density that is greater than the first density, wherein the compression molded core retains the second density when the compression molded core is disposed in the compartment of the midsole, wherein the footwear construction has an energy effi- ciency of at least 95%, wherein the compression molded core comprises a lobe on a lateral side of the longitudinal axis, the lobe defining a depth of the compression molded core that is greater than a depth of the compression molded core on a medial side of the longitudinal axis, wherein the lobe of the compression molded core pro- vides a greater energy return on the lateral side of the longitudinal axis than an energy return provided by the compression molded core on the medial side of the longitudinal axis, wherein the midsole support wall includes a medial support wall extending along the medial side of the longitudinal axis and a lateral support wall extending along the lateral side of the longitudinal axis, the medial support wall and the lateral support wall form- ing the compartment therebetween, wherein a height of the lateral support wall in the heel region is greater than a height of the medial support wall in the heel region, wherein the compression molded core includes an upper core portion projecting above the medial support wall and the lateral support wall, wherein the upper core portion is exposed and open to the environment above the medial support wall and the lateral support wall, and wherein the upper core portion includes a bite line that is adhered to a peripheral allowance of the upper to secure the midsole, including the compression molded core, to the upper.

2. The footwear construction of claim 1, wherein the first density is about 0.08 g/cm$^3$, wherein the second density is about 0.10 g/cm$^3$.

3. The footwear construction of claim 2, wherein the second foam has a tensile strength of about 1.73 MPa.

4. The footwear construction of claim 3, wherein the second foam has a percent elongation at break of about 356%, wherein the first density is between 0.05 g/cm$^3$ and 0.08 g/cm$^3$, inclusive, wherein the second density is between about 0.09 g/cm$^3$ and 0.12 g/cm$^3$, inclusive.

5. The footwear construction of claim 1, wherein the second durometer is 20 Asker C to 30 Asker C, inclusive.

6. The footwear construction of claim 5, wherein the first durometer is about 45 Asker C to about 65 Asker C.

7. The footwear construction of claim 1, comprising: an outsole disposed below the midsole and under the core lower surface of the compression molded core.

8. The footwear construction of claim 1, comprising: a plate extending from a forefoot region toward a heel region of the footwear construction, the plate disposed below the core lower surface, the plate including a plate upper surface and a plate lower surface, the plate upper surface contacting the core lower surface; and an outsole disposed below the midsole.

9. The footwear construction of claim 8, wherein the first density is between 0.05 g/cm$^3$ and 0.08 g/cm$^3$, inclusive, wherein the second density is between about 0.10 g/cm$^3$ and 0.12 g/cm$^3$, inclusive, wherein the first durometer is 45 Asker C to 65 Asker C, wherein the second durometer is 20 Asker C to 30 Asker C.

10. The footwear construction of claim 1, wherein the upper includes a Strobel board, wherein the Strobel board engages the compression molded core below the upper and below the bite line.

11. The footwear construction of claim 1, wherein the lobe is in the heel region of the footwear construction and comprises a first depth on a lateral side of the longitudinal axis in the heel region and a second depth on a medial side of the longitudinal axis in the heel region, wherein the first depth is greater than the second depth, wherein the compression molded core in the heel region provides a greater energy return on the lateral side of the longitudinal axis than on the medial side of the longitudinal axis in the heel region.

12. The footwear construction of claim 1, comprising:
an outsole disposed below the midsole, the outsole comprising an outsole part on a lateral side of the longitudinal axis, the outsole part forming a portion of a ground contacting surface of the footwear construction, wherein the lobe is above the outsole part.

13. A footwear construction comprising:
an upper extending from a heel region, through an arch region to a forefoot region, the upper includes a lower allowance;
a midsole including a midsole medial support wall extending along a medial side of a longitudinal axis along a length of the midsole, the length extending from a forefoot region to a heel region of the footwear construction, the midsole medial support wall including an upper portion, the midsole including a midsole lateral support wall extending along a lateral side of the longitudinal axis along the length of the midsole, the midsole medial support wall including another upper portion, the midsole medial support wall and the midsole lateral support wall forming a compartment therebetween, the midsole medial support wall and the midsole lateral support wall being constructed from a first foam having a first durometer;
an outsole disposed below the midsole, the outsole comprising an outsole part on the lateral side of the longitudinal axis, the outsole part forming a portion of a ground contacting surface of the footwear construction; and
a compression molded core disposed in the compartment and shielded at least partially from abrasion upon contact of the midsole with an object, the compression molded core being constructed from a second foam having a second durometer that is less than the first durometer, the second foam comprising thermoplastic polyester elastomer, the compression molded core including a core upper surface and a core lower surface, the core upper surface being disposed above the compartment,
wherein the compression molded core is formed by compressing the second foam such that the second foam transitions from a first density to a second density that is greater than the first density,
wherein the compression molded core retains the second density when disposed in the compartment of the midsole,
wherein the footwear construction has an energy efficiency of at least 95%,
wherein the compression molded core comprises a lobe on the lateral side of the longitudinal axis in the heel region above the outsole part, the lobe defining a depth of the compression molded core that is greater than a depth of the compression molded core on the medial side of the longitudinal axis in the heel region,
wherein the lobe of the compression molded core provides a greater energy return on the lateral side of the longitudinal axis in the heel region than an energy return provided by the compression molded core on the medial side of the longitudinal axis in the heel region,
wherein a height of the midsole lateral support wall in the heel region is greater than a height of the midsole medial support wall in the heel region to protect the lobe on the lateral side of the longitudinal axis in the heel region, wherein the compression molded core includes a lateral sidewall and a medial sidewall, wherein the lateral sidewall extends upward above the midsole lateral support wall and the medial sidewall extends upward above the midsole medial support wall,
wherein the lateral and medial sidewalls extend upwardly along the upper and form bite lines along which the compression molded core can be secured to a peripheral allowance of the upper, and
wherein the lateral and medial sidewalls extend upwardly above the midsole medial support wall and the midsole lateral support wall by approximately the same distance.

14. The footwear construction of claim 13,
wherein the first density is between 0.05 g/cm$^3$ and 0.08 g/cm$^3$, inclusive,
wherein the second density is between about 0.10 g/cm$^3$ and 0.12 g/cm$^3$, inclusive.

15. The footwear construction of claim 14,
wherein the first durometer is 45 Asker C to 65 Asker C, inclusive,
wherein the second durometer is 20 Asker C to 40 Asker C, inclusive.

16. The footwear construction of claim 15, comprising:
a plate extending from the forefoot region toward the heel region, the plate disposed below the core lower surface, the plate including a plate upper surface and a plate lower surface, the plate upper surface engaging the core lower surface.

17. A footwear construction comprising:
an upper;
a midsole including a midsole support wall forming a compartment under the upper, the midsole support wall being constructed from a first foam having a first durometer;
a longitudinal axis bisecting the footwear construction into a lateral portion and a medial portion, the longitudinal axis extending along a length of the midsole, the length extending from a forefoot region to a heel region of the footwear construction; and
a core disposed in the compartment and shielded from abrasion upon contact of the midsole with an object, the core being constructed from a second foam having a second durometer that is less than the first durometer, the second foam comprising thermoplastic polyester elastomer, the core including a core upper surface and a core lower surface, the core upper surface facing the upper,
wherein the core comprises a lobe on a lateral side of the longitudinal axis in the heel region, the lobe defining a depth of the core in the heel region that is greater than a depth of the core in the heel region on a medial side of the longitudinal axis,
wherein the lobe of the core provides a greater energy return on the lateral side of the longitudinal axis in the heel region than an energy return provided by the core on the medial side of the longitudinal axis in the heel region,
wherein the midsole support wall includes a medial support wall extending along the medial side of the longitudinal axis and a lateral support wall extending along the lateral side of the longitudinal axis, the medial support wall and the lateral support wall forming the compartment therebetween,
wherein a height of the lateral support wall in the heel region is greater than a height of the medial support wall in the heel region, wherein the core includes an upper core portion projecting above the medial support wall and the lateral support wall, wherein the upper core portion is exposed and open to the environment above the medial support wall and the lateral support wall, and wherein the upper core portion projects above the medial support wall and the lateral support wall by approximately the same distance along a medial side of the upper and a lateral side of the upper.

18. The footwear construction of claim 17, comprising:

an outsole disposed below the midsole, the outsole comprising an outsole part on the lateral side of the longitudinal axis, the outsole part forming a portion of a ground contacting surface of the footwear construction, wherein the lobe is above the outsole part.

\*  \*  \*  \*  \*